(12) United States Patent
Nagato

(10) Patent No.: US 8,334,669 B2
(45) Date of Patent: Dec. 18, 2012

(54) MULTI-AXIS DRIVER CONTROL METHOD, MULTI-AXIS DRIVER AND MULTI-AXIS DRIVE CONTROL SYSTEM HAVING THE SAME

(75) Inventor: Yoshifumi Nagato, Tokyo (JP)

(73) Assignee: THK Co., Ltd., Tokyo (JP)

( * ) Notice: Subject to any disclaimer, the term of this patent is extended or adjusted under 35 U.S.C. 154(b) by 342 days.

(21) Appl. No.: 12/739,525

(22) PCT Filed: Oct. 27, 2008

(86) PCT No.: PCT/JP2008/069426
§ 371 (c)(1),
(2), (4) Date: Apr. 23, 2010

(87) PCT Pub. No.: WO2009/057545
PCT Pub. Date: May 7, 2009

(65) Prior Publication Data
US 2010/0259209 A1    Oct. 14, 2010

(30) Foreign Application Priority Data

Oct. 31, 2007 (JP) ................................. 2007-284404

(51) Int. Cl.
*G05B 19/29* (2006.01)
*G05B 11/01* (2006.01)
*H02P 7/00* (2006.01)
(52) U.S. Cl. ......... 318/600; 318/127; 318/560; 318/671
(58) Field of Classification Search .................. 318/127, 318/560, 600, 671
See application file for complete search history.

(56) References Cited

U.S. PATENT DOCUMENTS

| | | | |
|---|---|---|---|
| 7,005,810 B2* | 2/2006 | Ueda et al. | 318/114 |
| 7,135,827 B1* | 11/2006 | Lampson | 318/135 |
| 2003/0230998 A1* | 12/2003 | Miyaji et al. | 318/625 |
| 2005/0258795 A1* | 11/2005 | Choi | 318/625 |
| 2011/0026387 A1* | 2/2011 | Sagarai | 369/47.53 |

FOREIGN PATENT DOCUMENTS

| | | |
|---|---|---|
| JP | 8-161604 A | 6/1996 |
| JP | 2000-287476 A | 10/2000 |
| JP | 2002-268745 A | 9/2002 |
| JP | 2007-267480 A | 10/2007 |

* cited by examiner

OTHER PUBLICATIONS

International Preliminary Report on Patentability (Form PCT/IB/373) of International Application No. PCT/JP2008/069426 mailed Jun. 1, 2010 with Form PCT/ISA/237. International Search Report of PCT/JP2008/069426, Mailing Date of Dec. 9, 2008.

*Primary Examiner* — Walter Benson
*Assistant Examiner* — Gabriel Agared
(74) *Attorney, Agent, or Firm* — Westerman, Hattori, Daniels & Adrian, LLP

(57) ABSTRACT

In the multi-axis driver control method for transmitting a command from an external device to the drive-axis basis controller of the multi-axis driver to set operation and/or parameters of the drive-axis basis controller, the external device is connected to the multi-axis driver on a one-to-one basis, and the external interface is connected to the drive-axis basis controller via a multi-dropped connecting portion. The drive-axis basis controller determines whether the command is self-addressed or not and, if the command is self-addressed, the drive-axis basis controller executes the command and transmits response data corresponding to the command and a transmission permission flag to the multi-dropped connecting portion. The multi-dropped connecting portion opens a transmission port in response to the transmission permission flag and transmits the response data to the external device, and after transmission is finished, the multi-dropped connecting portion closes the transmission port.

6 Claims, 6 Drawing Sheets

MULTI-AXIS DRIVER CONTROL METHOD, MULTI-AXIS DRIVER AND MULTI-AXIS DRIVE CONTROL SYSTEM HAVING THE SAME

TECHNICAL FIELD

The present invention relates to a multi-axis driver control method, a multi-axis driver and a multi-axis drive control system having the same.

BACKGROUND ART

There are plural linear motors, servomotors or stepping motors used in various carrying devices, moving parts of industrial robots and various tables used in machine tools. As drivers of these motors drive them independently on an axis basis, specific parameters are set for the respective drive axes. In addition, as for each of the drive axes, its driving method needs to be changed in accordance with the use conditions, the parameters need to be set appropriately for the respective drive axes in accordance with the use conditions.

The multi-axis driver holds particular parameters for respective drive axes and has a function to control motors provided for respective drive axes independently based on the parameters, programs held on the drive-axis basis and the like.

Here, setting or change of axis basis parameters or, for example, parameters regarding motor rotation is generally performed by connecting the multi-axis driver to an external device and inputting desired parameter values with use of the external device. Such an external device may be a special input device, a general-purpose personal computer or the like. Here, the driving system such as an actuator, the multi-axis driver for controlling the driving system and an external device for setting the parameters of the multi-axis driver make up a so-called multi-axis drive control system.

As a conventional multi-axis drive control system needs to output driving signals to plural motors, respectively, as disclosed in the patent document 1, a drive control board is provided for each drive axis and such drive control boards are built on the substrate.

Thus, the conventional multi-axis drive control system is configured to have the drive control boards having driver circuits with microcomputers for respective axes (respective motors to control) for control of the axes and to control operation amounts, the operation orders of motors on a drive-axis basis and the like.

Further, the drive control board needs an interface to receive commands issued from an external device and it is configured to be able to, for example, change, write and store parameters of the driver for controlling the motor via the interface by the external device. Furthermore, setting of monitor display method, setting of the communication speed, setting of temporary simple job operation and check of the operation and the like are performed with use of the external device. Interface communication standards for such external input includes serial communication, parallel communication, LAN and the like. However, many personal computers use RS232C external interface as external input device.

As described above, in the conventional multi-axis drive control technique in which, for example, N motors are used to drive the N axes, the control needs N drive control boards, and also needs RS232C ports as external interfaces for respective drive control boards. Here, as RS232C is one-to-one communication standards, multi connection is difficult in terms of hardware. Besides, as the standards are of one-to-one communication only, this RS232C communication protocol is also configured based on one-to-one communication.

The patent document 2 discloses a technique of creating a multi-dropped network that allows multi connection in the RS232C one-to-one communication hardware and communication protocol. As disclosed in the patent document 2, the network is constructed in optical communications having plural automatic dispensers (1A to 1C) by interposing an RS232C/RS485 converter having a software-like switching function to the hardware based on one-to-many or many-to-many interface standards (RS485) in the network having the hardware based on the one-to-one interface standards (RS232C) and the communication protocol and achieving multi-dropped connection.

However, although the RS485 allows connection of plural modules having unique IDs thereunder, there are some problems in view of two-way communication. For example, the modules are configured to simultaneously receive data sent via the RS485 but to reply to the self-addressed data only when a communication line for transmission is available. Therefore, there occur problems that the response data comes into collision with other data and the response to the external device is delayed. Further, as communication from the modules to the external device is always available, they are problematically susceptible to external noise.

In a recent industrial machine tool, highly-accurate positioning, for example, of 1 micrometer or less and high-speed control are required. For such highly-accurate and high-speed multi-axis drive control, displacement of stop position, malfunction due to the external noise and the like are critical problems in the multi-axis drive control system.

Further, when the axes to control are increased in number, the driving portion (driver) is upsized and wiring between the driver and each motor becomes complicated. Furthermore, in the machine and equipment that make greater use of multi-axis drive control, the prices of a board and an external interface provided for each axis directly brings about a cost increase of the drive control system.

[Patent Document 1] Japanese Patent Application Laid-Open No. 2000-287476

[Patent Document 2] Japanese Patent Application Laid-Open No. 8-161604

DISCLOSURE OF THE INVENTION

Problems to be Solved by the Invention

In view of the above, the present invention has an object to provide a multi-axis driver control method for, in a multi-axis driver of a multi-axis drive control system for multi-axis driving with a plurality of driving motors provided on drive-axis basis, allowing communication with a drive-axis basis controlling portion of the multi-axis driver configured to include microcomputers (drive-axis basis controllers) by using a single general-purpose external interface. The present invention further provides the multi-axis driver that is faster and more stable than a conventional one by providing the drive-axis basis controllers of the multi-axis driver on a single substrate, and the multi-axis drive control system having such a multi-axis driver.

Means for Solving the Problems

In order to solve the above-mentioned problems, the present invention provides a multi-axis driver control method for transmitting a command from an external device to a drive-axis basis controller of a multi-axis driver to set operation and/or parameters of the drive-axis basis controller, comprising the steps of: connecting a one-to-one communication port of the external device to an external interface of the multi-axis driver on a one-to-one basis; connecting the external interface to the drive-axis basis controller via a multi-dropped connecting portion; the multi-dropped connecting portion converting the command into protocol data suitable for multi-dropped connection and transmitting to the data to the drive-axis basis controller; the drive-axis basis controller determining whether the command is self-addressed or not and, if the command is self-addressed, the drive-axis basis controller executing the command and transmitting response data corresponding to the command and a transmission permission flag to the multi-dropped connecting portion; the multi-dropped connecting portion opening a transmission port in response to the transmission permission flag and transmitting the response data to the external device; and after transmission is finished, the multi-dropped connecting portion closing the transmission port. Here, the transmission port is a port provided in the multi-dropped connecting portion. Besides, it is preferable that communication standards for the multi-dropped connection are of RS422 or RS485.

With this structure, it is possible to set parameters or the like of plural drive-axis basis controllers independently even if the general-purpose communication port of the external device is connected to the single external interface of the multi-axis driver. It is also possible to minimize the influence of external noise and the like and to set the parameters at high speeds.

It is preferable that a unique identification number of the drive-axis basis controller is a voltage value using an analog port of the drive-axis basis controller. Different voltage values obtained by resistance division from the power source line near the drive-axis basis controllers are input to the respective analog ports thereby to assign addresses to the respective drive-axis basis controllers extremely simply.

The present invention further provides a multi-axis driver for performing drive-axis basis control, comprising: a one-to-one external interface for external connection; a first communication controller that is connected to the external interface and is capable of multi-dropped connection thereunder; a second communication controller that is connected to the first communication controller on a drive-axis basis, has an identical communication protocol to a communication protocol of the first communication controller and has an opening and closing unit of a transmission port; and a plurality of drive-axis basis controllers that is connected to the second communication controller on the drive-axis basis and configured to execute drive control on the drive-axis basis, each of the drive-axis controllers having a command executing unit that has a unique identification number and is configured to receive and execute a command transmitted with the unique identification number from an external device connected to the external interface of the multi-axis driver, and a unit for, after execution of the command, transmitting response data corresponding to the command and a transmission permission flag that requests the second communication controller to open the transmission port so as to transmit the response data to the external device. Besides, it is preferable that the drive-axis basis controller further comprises a unit for inputting a different voltage value as the unique identification number to an analog port of the drive-axis basis controller.

It is preferable that the first communication controller, the second communication controller and the drive-axis basis controllers are provided on the same substrate. With this structure, it is possible to downsize the multi-axis driver and reduce the cost.

The present invention further provides a multi-axis drive control system comprising: a plurality of actuators driven on a drive-axis basis; an inverter for supplying power to the actuators; a multi-axis driver for controlling the power of the inverter on the drive-axis basis, the multi-axis driver having a one-to-one external interface for external connection; a first communication controller that is connected to the external interface and is capable of multi-dropped connection thereunder; a second communication controller that is connected to the first communication controller on a drive-axis basis, has an identical communication protocol to a communication protocol of the first communication controller and has an opening and closing unit of a transmission port; and a plurality of drive-axis basis controllers that is connected to the second communication controller on the drive-axis basis and configured to execute drive control on the drive-axis basis, each of the drive-axis controllers having a command executing unit that has a unique identification number and is configured to receive and execute a command transmitted with the unique identification number from an external device connected to the external interface of the multi-axis driver, and a unit for, after execution of the command, transmitting response data corresponding to the command and a transmission permission flag that requests the second communication controller to open the transmission port so as to transmit the response data to the external device; and the external device configured to set operation and/or parameters of the multi-axis driver.

Effects of the Invention

According to the present invention, it is possible to set the drive-axis basis controllers by the multi-axis driver having a single external interface. Besides, according to the present invention, it is possible to make up a compact multi-axis driver without complex wiring and upsizing of the device. Further, use of the multi-axis driver of the present invention makes it possible to construct a stable and low-cost multi-axis drive control system.

REFERENCE NUMERALS

1 . . . multi-axis drive control system, 10 . . . multi-axis driver, 11 . . . external device (special or dedicated driver), 12 . . . personal computer, 13 . . . linear motor actuator, 15 . . . encoder, 110 . . . multi-dropped connecting portion, 111 . . . RS232C transceiver, 112 . . . RS485 transceiver, 113 . . . action flag (transmission permission flag), 120 . . . drive-axis basis controlling portion, 121 . . . RS232C communication cable, 140 . . . power controller, 300 . . . power source line, 310 . . . encoder signal line

MODE FOR CARRYING OUT THE INVENTION

Figure 1:
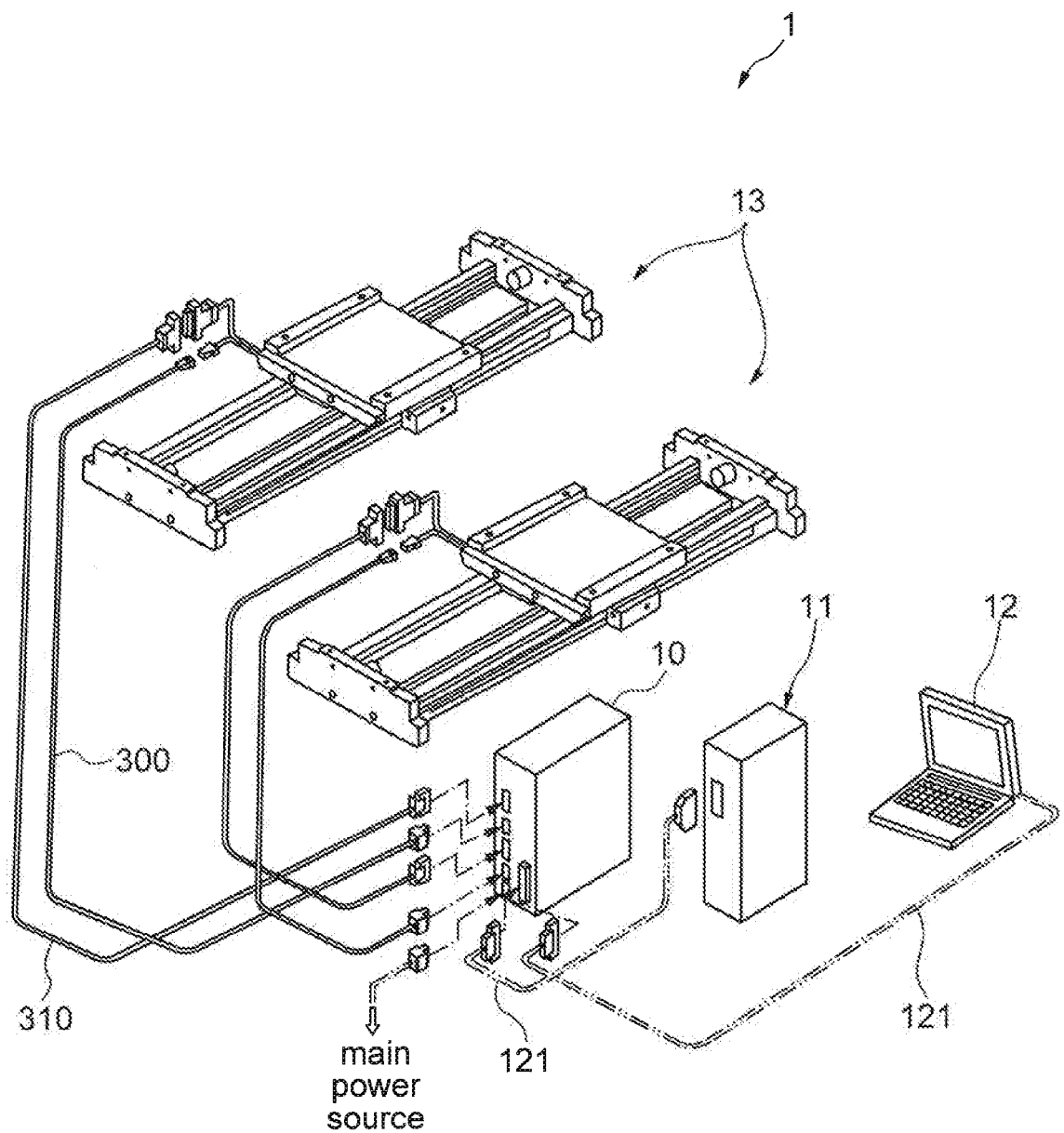
FIG. 1 is a perspective view illustrating a multi-axis drive control system according to an exemplary embodiment of the present invention.

FIG. 1 is a perspective view of a multi-axis drive control system 1 according to an exemplary embodiment of the present invention. In this multi-axis drive control system 1, two linear motor actuators 13 are controlled by a multi-axis driver 10. The two linear motor actuators 13 shown in this system may be replaced with a three-axis XYZ stage as an object for multi-axis drive control. Also, they may be an industrial robot having 8 axes, 16 axes or the like. When the objects for control are increased in number, the number of power source lines 300 connecting the multi-axis driver 10 to the linear motor actuators 13 and the number of encoder signal lines 310 are increased accordingly, and the multi-axis driver 10 has a corresponding number of output ports.

The multi-axis driver 10 has microcomputers inside, which generate instructions of movement control of the linear motor actuators 13 and control them. The multi-axis driver 10 has an external interface for connection to the external device.

The communication standards of the external interface are of a serial communication system, for example, RS232C. This is because the external device used is often a personal computer which typically has an external interface and the communication standards of the external interface are of RS232C.

The multi-axis drive control system 1 illustrated in FIG. 1 is structured to use a personal computer 12 as an external device or an external device (special driver) 11 designed specifically for the multi-axis driver 10.

The multi-axis driver 10 is connected to the special driver 11 or the personal computer 12 via a RS232C communication cable that is a connection interface with the external device. Either of them is used to set axis basis driving parameters of the multi-axis driver 10, operations of the linear motor actuators 13 and the like. As illustrated in FIG. 1, the multi-axis driver 10 is configured to set the parameters on a drive-axis basis by the single external interface. More specifically, the special driver 11 or personal computer 12 can be used to set the language, for example, switch the language between Japanese and English. It is also possible to set checking, changing, writing and storing of the parameters. Further, it is possible to set monitoring, simple job operation, setting of the communication speed, for example, change of the communication speed from 1200 bps to 38400 bps.

The special driver 11 or personal computer 12 is used to make settings of various parameters of the multi-axis driver 10 or the like. These settings are used as a basis to determine movement conditions of the linear motor actuators 13. Connected to the multi-axis driver 10 are power source lines 300 for supplying power to AC linear synchronous motors and encoder signal lines 310 in which control signals of the liner motor actuators 13 flow.

Each of the linear motor actuators 13 has a base member, raceway rails provided on the base member, a slide table capable of back and forth motion along the raceway rails and an AC linear synchronous motor (not shown) for moving the slide table on the base member.

The output (thrust) of the AC linear synchronous motor for moving the linear motor actuators 13 is determined by the size of the load applied to the slide table. Typically, the thrust of the AC linear synchronous motor is determined by a repulsive force between the magnetic field that is generated at the magnetic pole of a mover by a driving current flowing in an excitation coil of the motor and a plurality of stator magnets arranged in a line on each side wall of the base member.

On each side wall of the base member, N poles and S poles of the stator magnets are aligned alternately and opposing the excitation coil.

Figure 2:
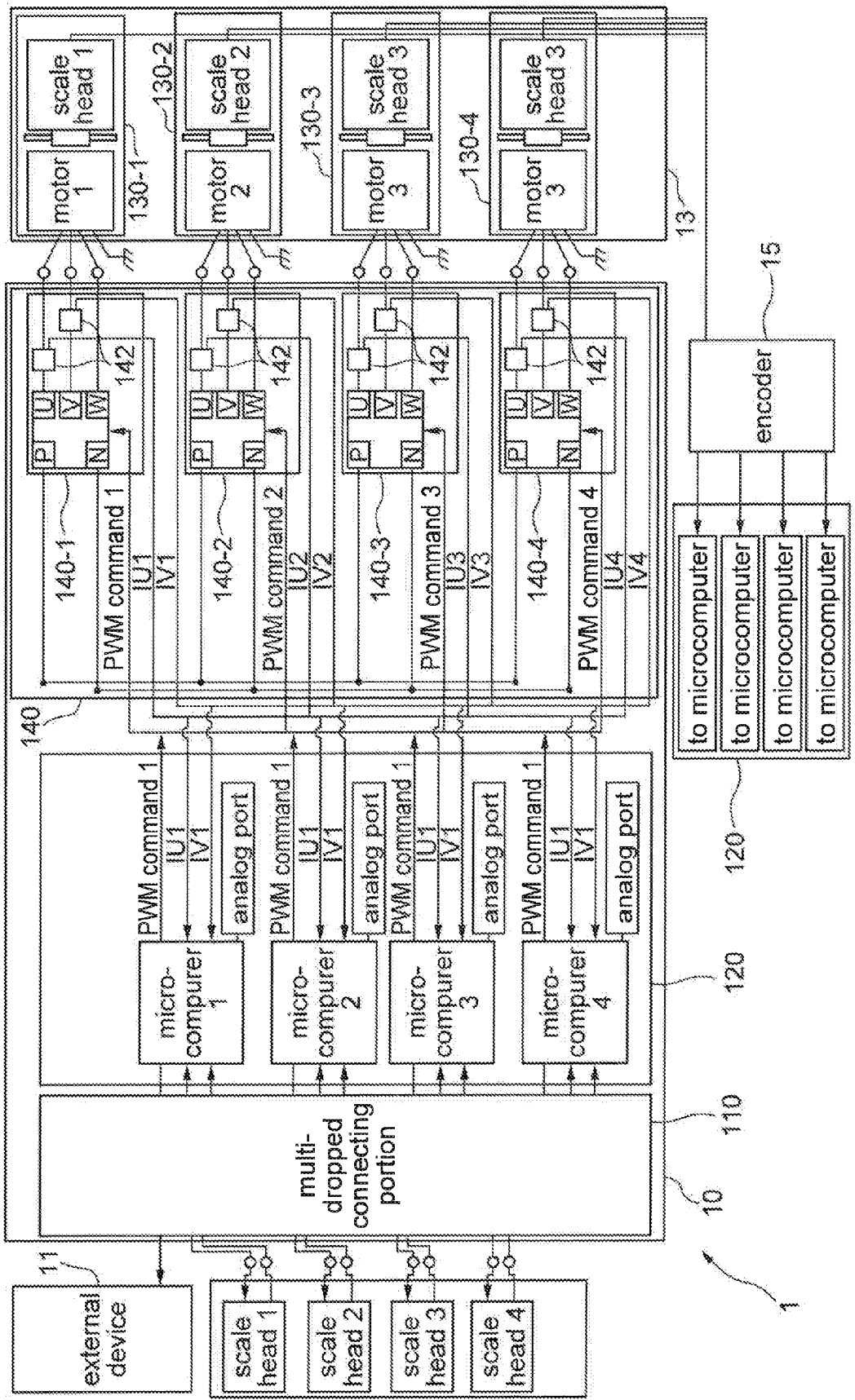
FIG. 2 is a wiring diagram of the multi-axis drive control system.

FIG. 2 illustrates a wiring diagram of the multi-axis drive control system. The multi-axis driver 10 is connected to the external device 11, the linear motor actuators 13 and scale heads. The multi-axis driver 10 has a multi-dropped connecting portion 110, a drive-axis basis controlling portion 120 for generating and processing control signals of the linear motor actuators 13, and a power controller 140 for supplying power to the linear motor actuators 13.

Each of the linear motor actuators 13 has three-phase excitation coils of U, V and W phases. The power controller 140 of the multi-axis driver 10 carries a three-phase AC through these excitation coils so that a thrust is generated on the excitation coils of the linear motor actuator 13 along the arrangement of the stator magnets. Here, in the power controller 140, DC is converted into three-phase AC by the inverters (140-1 to 140-4), which is then supplied to the corresponding linear motor actuators (130-1 to 130-4). Current of each phase is detected by a current detector 142 and current values shown in FIG. 2 (IU1 to IU4, IV1 to IV4) are fed back to the microcomputers (drive-axis basis controllers) of the drive-axis basis controlling portion 120.

On one side wall of the base member of each linear motor 13 illustrated in FIG. 1, a bracket having an approximately L-shaped cross section is fixed thereto and on the upper surface of this bracket, a linear scale is attached thereto in the longitudinal direction of the base member. Besides, on the lower surface of the slide table, an encoder is fixed thereto for reading the linear scale in accordance with movement of the slide table. The encoder outputs a pulse signal at intervals that correspond to the moving speed of the slide table.

Power distribution to the excitation coils of the linear motor actuators 13 and transmission of output signals of the encoder are made with use of flexible printed wiring boards, which are fixed to the lower surface of the slide table and connected, at the side of the base member, to the multi-axis driver 10 by the encoder signal line 310.

In the thus-configured linear motor actuator, when the three-phase AC is passed to the excitation coils fixed to the slide table, a thrust is generated at the excitation coils along the arrangement of the stator magnets and the slide table move back and forth along the raceway rail. The encoder reads the linear scale and outputs an output signal in accordance with the moving speed and moving distance of the slide table. Then, the output signal from the encoder is used as a reference to control power distribution to the excitation coils thereby to control the back and forth movement of the slide table independently and arbitrarily.

The linear motor actuator 13 moves back and forth as described above, however, setting of movement conditions of the linear motor actuator 13 (setting of the parameters) is performed with use of the external device 11. In the multi-axis drive control system as illustrated in FIG. 2, in order to control four linear motor actuators 130-1 to 130-4, four microcomputers 1 to 4 are provided in the drive-axis basis controlling portion 120. The microcomputers 1 to 4 correspond to the linear motor actuators 130-1 to 130-4, respectively, and control the respective linear motor actuators independently.

In the related art, parameter setting of the microcomputers 1 to 4 requires external interfaces for the respective microcomputers in the multi-axis driver 10, which external interfaces are used for connection with the external devices 11.

That is, four external interfaces are required in the multi-axis driver 10. In the present invention, as the multi-dropped connecting portion 110 is interposed between the external device and the microcomputers 1 to 4, only one external interface is used to be able to transmit a command to each of the four microcomputers. Further, the external device is configured to be able to receive the response date from any of the four microcomputers via the single external interface.

The movement control of each linear motor actuator 13 is performed by detecting a position of the linear motor actuator 13 with use of the scale head and the linear scale, processing its result at the encoder 15 and feeding back the output to the corresponding microcomputer (1 to 4).

Figure 3:
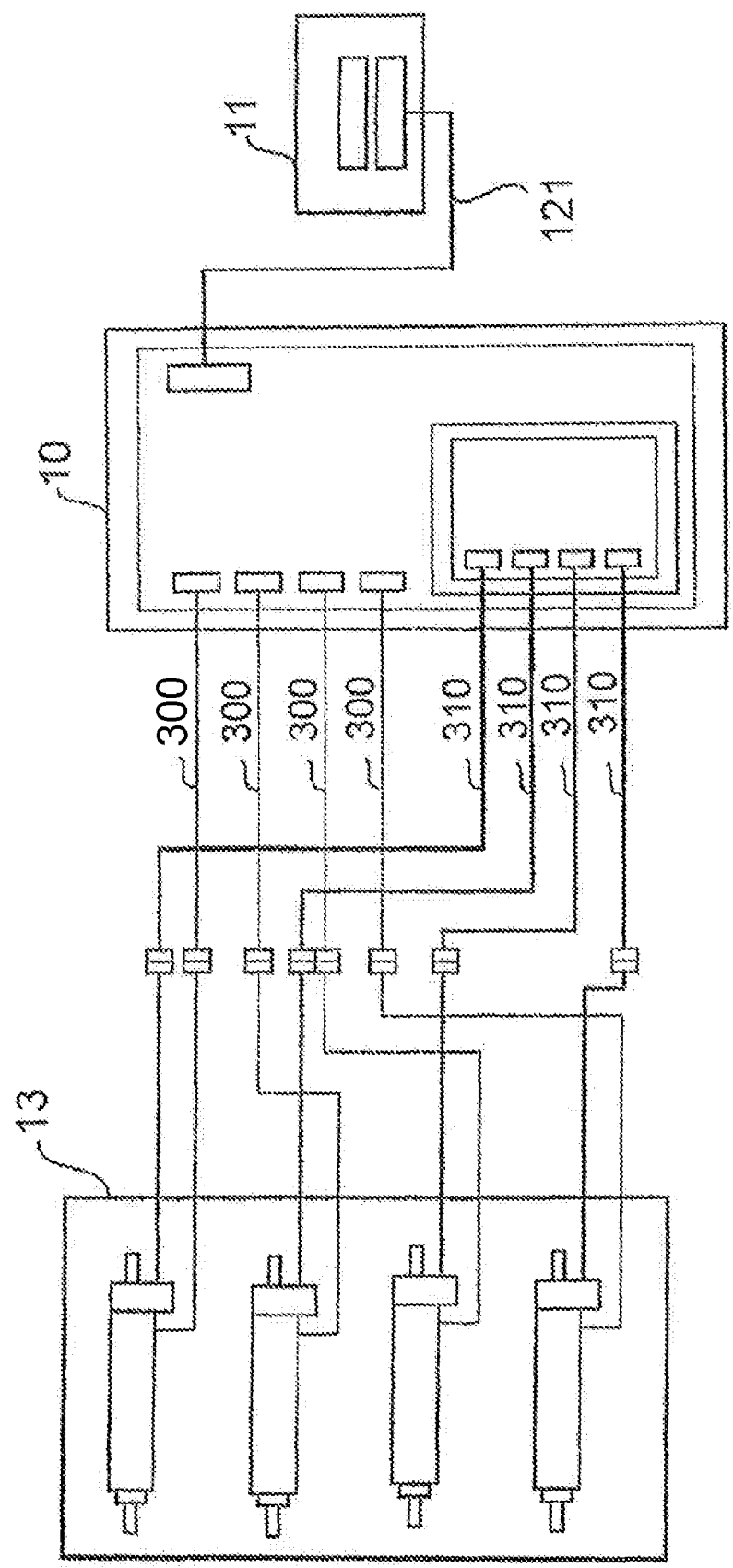
FIG. 3 is a detail view illustrating connection of a multi-axis driver, an external device and linear motor actuators.

FIG. 3 is a detail view illustrating connection of the multi-axis driver 10, the external device 11 and the linear motor actuators 13. The external interface (RS232C interface) of the multi-axis driver 10 is connected to the RS232C interface of the external device 11 via the communication cable 121. As described above, the external device 11 may be a personal computer with a RS232C external communication port.

The multi-axis driver 10 and the four linear motor actuators 13 are connected via the respective power cables (power source lines) 300 and the signal cables (encoder signal lines) 310, and the four linear motor actuators 13 are controlled by the single multi-axis driver 10. Further, advantageously, parameter setting of the four linear motor actuators 13 or the like can be made by using the single RS232C external interface for connection to the external device 11.

Figure 4:
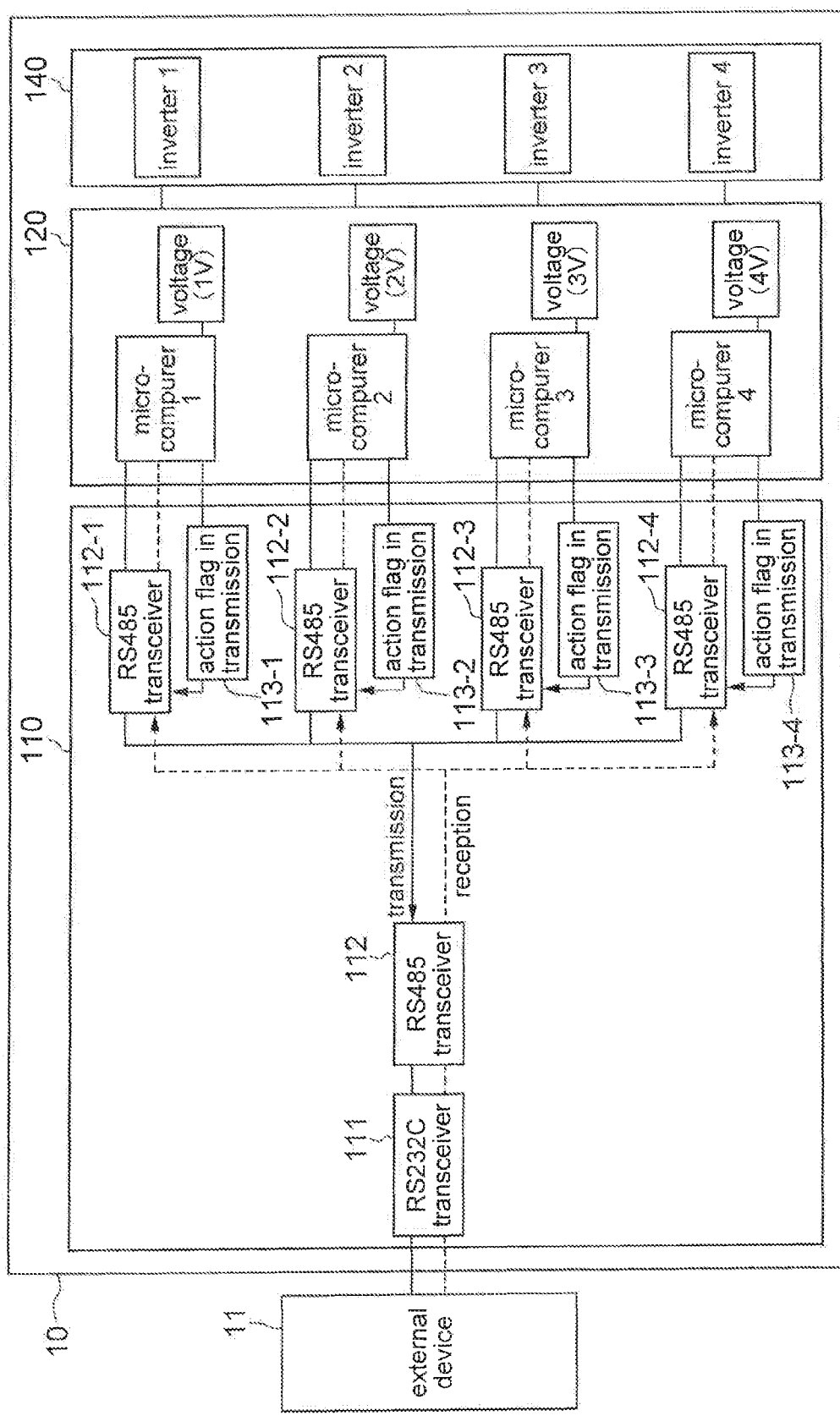
FIG. 4 is a view illustrating structures of a multi-dropped connecting portion, a drive-axis basis controlling portion and a power controller.

FIG. 4 is a view illustrating the structures of the multi-dropped connecting portion 110, the drive-axis basis controlling portion 120 and the power controller 140 that comprises the multi-axis driver 10. The external device 11 is connected to the multi-axis driver 10 based on the RS232C communication standards. The RS232C transceiver 111 is connected to the RS485 transceiver 112 based on one-to-many or many-to-many interface standards. The one-to-many interface standards for connecting to the RS232C transceiver 111 are not limited to RS485, but may be one-to-many connection standards RS422.

As illustrated in FIG. 4, a command transmitted from the external device 11 is converted to RS485 data by the RS232C transceiver 111, which then passes through the RS485 and is transmitted to the microcomputers 1 to 4 via the RS485 transceivers 112-1 to 112-4.

When checking the parameters, for example, set in the microcomputer 1 with use of the external device 11, its command is transmitted from the RS232C interface provided in the external device 11 to the external interface (RS232C) of the multi-axis driver 10. Then, as the command transmitted from the external device 11 is of RS232C, it is converted to RS485 data by the RS232C transceiver 111 and simultaneously transmitted to all of the RS485 transceivers 112-1 to 112-4 connected to the microcomputers 1 to 4.

Here, a communication packet for RS485 data transmitted from the RS485 transceiver 112 to the microcomputers 1 to 4 is composed of combination of start bit, axis number (address), command, data, check sum and the like. As the RS485 is used, it is possible to identify the multi-dropped connected devices independently. This makes it possible to specify a microcomputer that is desired to be set by the external device and transmit a command thereto.

Identification of the microcomputers 1 to 4 illustrated in FIG. 4 can be made, for example, by a voltage. Specifically, identification can be made by inputting 1V to the analog port of the microcomputer 1, 2V to the analog port of the microcomputer 2, 3V to the analog port of the microcomputer 3, and 4V to the analog port of the microcomputer 4.

Figure 5:
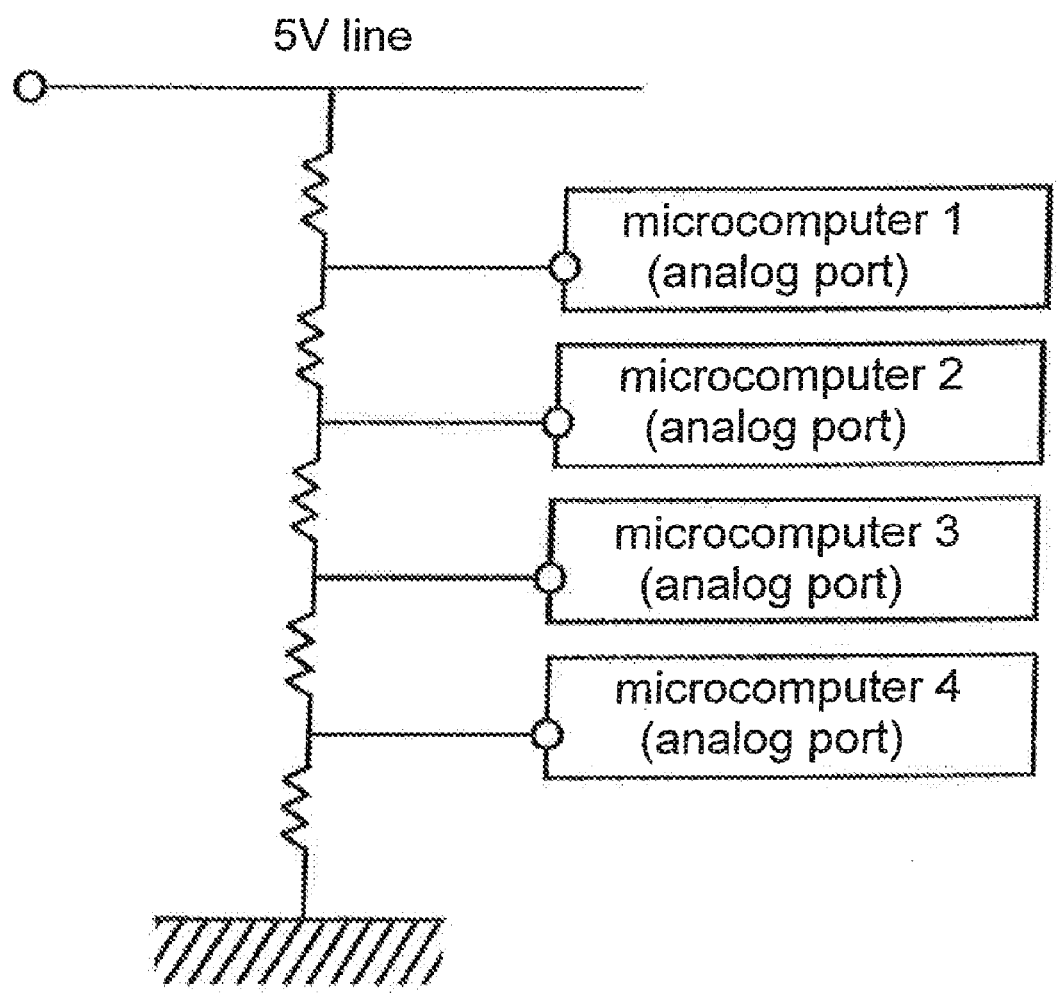
FIG. 5 is a view illustrating an example of a resistance dividing circuit for inputting voltages to respective analog ports of microcomputers.

FIG. 5 illustrates an example of a resistance dividing circuit for inputting voltages to corresponding analogue ports of the microcomputers. With the resistance division from a voltage line near the microcomputers, it is possible to easily input difference voltages to the respective microcomputers. As a voltage value input to each analog port is an identification code (address), the external device 11 can specify the corresponding microcomputer to which the command is to be transmitted, and the microcomputer can determine whether or not the command is transmitted to itself with use of the identification code.

When the command received by a microcomputer is sure to be a self-addressed command (command addressed to the microcomputer), the microcomputer processes and executes the command. For example, when the command is to control movement of the linear motor actuator 13, the power controller 140 is used to control power supplied to the linear motor actuator 13. Once the microcomputer processes the received command, it transmits response data corresponding to the command to the external device 11. At this time, it transmits to the RS485 transceiver connected thereto an action flag (transmission permission flag) 113 that requests permission to transmit the response data to the external device 11.

RS485 is standards for two-way data transmission and reception, and data transmission is performed when the communication path is available. However, under the typical specifications that allow transmission as long as the communication path is available, due to influence of external noise, status of the communication path and the like, data is transmitted from a plurality of RS485 transceivers to the communication path and a communication packet may be congested.

Then, when it transmits the data in response to the command transmitted to itself, to the external device 11, the microcomputer transmits, to the RS485 transceiver 112 connected to itself, an action flag that requests permission to transmit data to the communication path. For example, when the command is transmitted to the microcomputer 1, the microcomputer executes processing of the self-addressed command, then, transmits the action flag to the RS485 transceiver 112-1 so as to open the transmission port of the RS185 transceiver 112-1 and transmits the response data to the external device 11.

Thus, when the microcomputer transmits the response data, it transmits the action flag to the RS485 transceiver connected to itself thereby to be able to eliminate any influence due to external noise and convergence of data in the communication path. Besides, if the response data is transmitted after the communication path becomes available, it takes much time for the external device to receive the response data, which causes a problem of delay in data processing. However, such a problem can be solved with the structure of the present invention.

Figure 6:
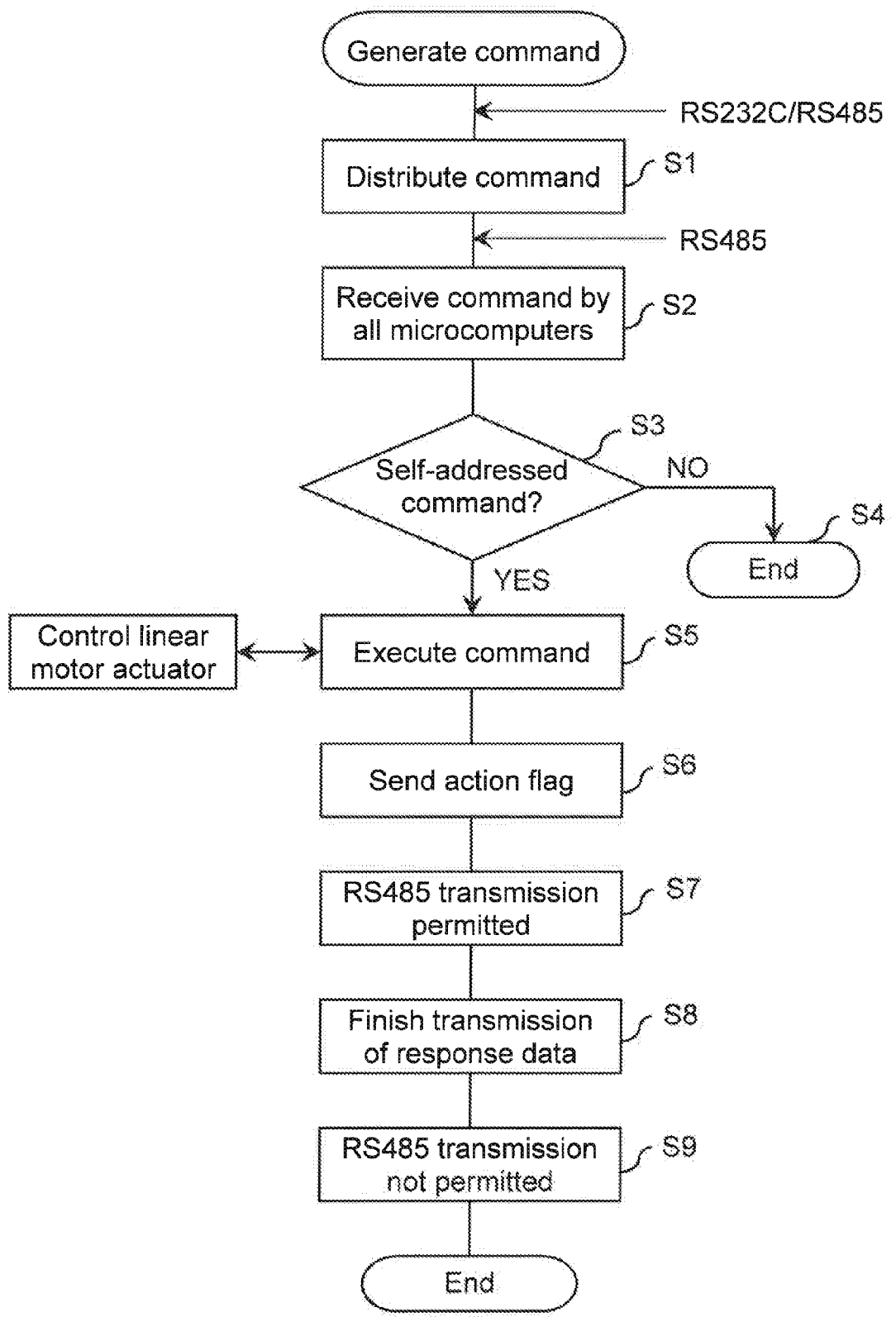
FIG. 6 is a flowchart of a processing operation when a command is given to the multi-axis driver.

FIG. 6 is a flowchart of the processing when the command is sent from the external device to the multi-axis driver 10. When the command is generated by the external device 11, it transmits the command to the multi-axis driver 10 via the RS232C external interface. The transmitted command is distributed to the microcomputers 1 to 4 via the multi-dropped connecting portion 110 (S1).

Each of the microcomputers 1 to 4 receives a command (S2) and determines whether or not the command is a command addressed to itself (S3). If the command is not a self-addressed command, the processing ends (S4). A microcomputer that has received the self-addressed command executes the command and, for example, makes a control of the linear motor actuator 13 (S5).

When the processing of the command is finished, it transmits, to the RS485 transceiver connected to itself, the action flag that requests permission to transmit data to the communication path (S6). Once the RS485 transceiver receives the action flag, it opens the transmission port so that transmission is possible (S7) and the microcomputer transmits the response data in response to the command (S8). After the response data is transmitted to the external device 11, the RS485 transceiver closes the transmission port (S9).

The preferred exemplary embodiment of the present invention has been described up to this point. However, the technical scope of the present invention is not limited to the above-described embodiment. Various modifications and improvements may be added to the above-described embodiment. For example, the external interface described above is RS232C, but it is not limited to RS232C and may be Ethernet (registered trademark), IEEE1394, USB or the like, which can bring about the same effect.

The present application is based on Japanese Patent Application No. 2007-284404 filed on Oct. 31, 2007, and its contents are incorporated by reference herein.

The invention claimed is:

1. A multi-axis driver control method for transmitting a command from an external device to a drive-axis basis controller of a multi-axis driver to set operation and/or parameters of the drive-axis basis controller, comprising the steps of:
    connecting a one-to-one communication port of the external device to an external interface of the multi-axis driver on a one-to-one basis;
    connecting the external interface to the drive-axis basis controller via a multi-dropped connecting portion;
    the multi-dropped connecting portion converting the command into protocol data suitable for multi-dropped connection and transmitting to the data to the drive-axis basis controller;
    the drive-axis basis controller determining whether the command is self-addressed or not and, if the command is self-addressed, the drive-axis basis controller executing the command and transmitting response data corresponding to the command and a transmission permission flag to the multi-dropped connecting portion;
    the multi-dropped connecting portion opening a transmission port in response to the transmission permission flag and transmitting the response data to the external device; and
    after transmission is finished, the multi-dropped connecting portion closing the transmission port.

2. The multi-axis driver control method according to claim 1, wherein communication standards for the multi-dropped connection are of RS422 or RS485.

3. The multi-axis driver control method according to claim 1 or 2, wherein a unique identification number of the drive-axis basis controller is a voltage value using an analog port of the drive-axis basis controller.

4. A multi-axis driver for performing drive-axis basis control, comprising:
    a one-to-one external interface for external connection;
    a first communication controller that is connected to the external interface and is capable of multi-dropped connection thereunder;
    a second communication controller that is connected to the first communication controller on a drive-axis basis, has an identical communication protocol to a communication protocol of the first communication controller and has an opening and closing unit of a transmission port; and
    a plurality of drive-axis basis controllers that is connected to the second communication controller on the drive-axis basis and configured to execute drive control on the drive-axis basis, each of the drive-axis controllers having a command executing unit that has a unique identification number and is configured to receive and execute a command transmitted with the unique identification number from an external device connected to the external interface of the multi-axis driver, and a unit for, after execution of the command, transmitting response data corresponding to the command and a transmission permission flag that requests the second communication controller to open the transmission port so as to transmit the response data to the external device.

5. The multi-axis driver according to claim 4, further comprising a unit for inputting a different voltage value as the unique identification number to an analog port of the drive-axis basis controller.

6. A multi-axis drive control system comprising:
    a plurality of actuators driven on a drive-axis basis;
    an inverter for supplying power to the actuators;
    a multi-axis driver for controlling the power of the inverter on the drive-axis basis, the multi-axis driver having a one-to-one external interface for external connection; a first communication controller that is connected to the external interface and is capable of multi-dropped connection thereunder; a second communication controller that is connected to the first communication controller on a drive-axis basis, has an identical communication protocol to a communication protocol of the first communication controller and has an opening and closing unit of a transmission port; and a plurality of drive-axis basis controllers that is connected to the second communication controller on the drive-axis basis and configured to execute drive control on the drive-axis basis, each of the drive-axis controllers having a command executing unit that has a unique identification number and is configured to receive and execute a command transmitted with the unique identification number from an external device connected to the external interface of the multi-axis driver, and a unit for, after execution of the command, transmitting response data corresponding to the command and a transmission permission flag that requests the second communication controller to open the transmission port so as to transmit the response data to the external device; and
    the external device configured to set operation and/or parameters of the multi-axis driver.

* * * * *